(12) United States Patent
Clemans et al.

(10) Patent No.: US 8,726,531 B2
(45) Date of Patent: May 20, 2014

(54) CHUCK ALIGNMENT APPARATUS

(76) Inventors: Robert Clemans, Washougal, WA (US);
Bruce Isley, Kelso, WA (US); Michael Payton, Vancouver, WA (US); Peter Ackerman, Vancouver, WA (US); Eric Koppes, Washougal, WA (US)

(*) Notice: Subject to any disclaimer, the term of this patent is extended or adjusted under 35 U.S.C. 154(b) by 294 days.

(21) Appl. No.: 13/251,041

(22) Filed: Sep. 30, 2011

(65) Prior Publication Data

US 2012/0079730 A1    Apr. 5, 2012

Related U.S. Application Data

(60) Provisional application No. 61/404,271, filed on Sep. 30, 2010.

(51) Int. Cl.
*G01B 11/27* (2006.01)
*G01B 5/25* (2006.01)

(52) U.S. Cl.
USPC .......................... 33/286; 33/645; 33/DIG. 21

(58) Field of Classification Search
USPC .................. 33/286, 613, 645, 655, 657, 661, 33/DIG. 21; 356/153
See application file for complete search history.

(56) References Cited

U.S. PATENT DOCUMENTS

| | | | | |
|---|---|---|---|---|
| 3,897,139 A * | 7/1975 | Caruolo et al. | ............... | 359/873 |
| 4,442,524 A * | 4/1984 | Reeder et al. | ................ | 372/107 |
| 5,077,905 A * | 1/1992 | Murray, Jr. | ...................... | 33/412 |
| 5,572,797 A * | 11/1996 | Chase | ............................. | 33/286 |
| 5,798,879 A * | 8/1998 | Salvio | ............................ | 359/857 |
| 6,151,793 A * | 11/2000 | Carlen | ............................ | 33/645 |
| 6,198,580 B1 * | 3/2001 | Dallakian | .................... | 359/822 |
| 6,595,460 B1 * | 7/2003 | Jones | .......................... | 242/538.2 |
| 2011/0102919 A1 * | 5/2011 | Song | ............................ | 359/822 |
| 2012/0051057 A1 * | 3/2012 | Misener et al. | ............... | 362/259 |

FOREIGN PATENT DOCUMENTS

WO    WO 2010142536 A1 * 12/2010  ............. G01B 11/27

* cited by examiner

*Primary Examiner* — R. A. Smith
(74) *Attorney, Agent, or Firm* — Robert A Pasic

(57) ABSTRACT

The invention pertains to the alignment of chucks used in the web handling industry. The device includes specialized mounting features to align a light beam with a given chuck. Two of these assemblies are positioned such that each light beam aligns with the other. In this orientation the two chucks are aligned.

6 Claims, 7 Drawing Sheets

CHUCK ALIGNMENT APPARATUS

FIELD OF INVENTION

Figure 1:
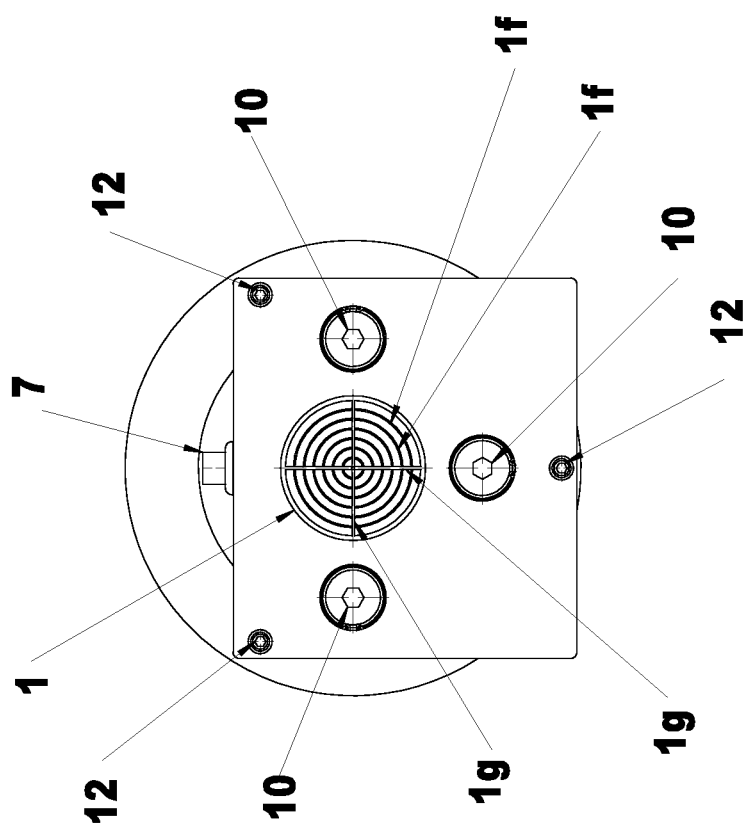

The invention is generically used in the area of "web handling". This industry includes the manufacturing or processing of continuous lengths of generally thin material. One of the more common related industries is the paper manufacturing industry. The paper is processed as a continuous strip (or web) in order to properly control this web rollers are used to route and tension the web as it travels from one process to another. One critical function in this industry is the interchangeability of the handling rollers. To provide for replacement or change out of these rollers each roller is supported on the ends by "chucks". The chuck includes interfaces for drive or tensioning equipment and support for attaching rolls. Due to support and manufacturing requirements each chuck establishes it's own axis of rotation, these two rotational axes need to be aligned (rotate about the same axis) in order to provide consistent web handling characteristics such as web tension, web tracking, reduction of excessive roll driving torque and reduction of excessive wear on the chuck and roll components.

The invention is an apparatus specifically designed to align these chucks, thus providing better web handling process control.

BACKGROUND OF RELATED ART

Prior to the instant invention the web handling industry relied on various techniques. These techniques range in complexity from simple to costly. A current method of alignment consists of placing a roller into each chuck, then mounting the two chucks on to the support structures. Having done this, the roller is spun manually and the chucks are adjusted until the roller rotates smoothly without binding. As can be imagined this is a very time consuming process and requires very specialized training.

The invention eliminates several of the drawbacks associated with the current methods. The invention provides a clear indicator of the chuck rotational axis. This indicator is not a solid body and therefore does not inflict binding forces between the two chucks. Binding forces cause the chucks to bend or deflect during rotation of the roller. These deflections are hard to observe and can cause very high forces on the chucks. The elimination of a structural connection allows each chuck to establish and maintain an independent axis of rotation. The specialized skill required to observe and correct a misaligned set of chucks is greatly reduced. Accurate alignment of chucks reduces chuck wear and increases consistent web tension during use.

SUMMARY OF INVENTION

The invention apparatus comprises a laser device and mounting features for mounting the device on center with a roll handling chuck. The apparatus holds a laser light axially such that the light beam projects away from the shaft but on axis with the rotation of the shaft. Mounting features included in the apparatus allow for adjustment of the mounting such that the beam is aligned accurately with the shaft's axis of rotation. During alignment of two chucks an additional apparatus is attached to the end of the other chuck.

The laser device is located in the apparatus concentrically with alignment circles marked on a surface that is essentially perpendicular with the laser beam. If the shaft is constrained to only rotate about a single axis the laser beam can be adjusted such that it also rotates without translation when the shaft is rotated. This alignment can only occur if the laser beam and the axis of rotation are in fact coincident.

To allow for this adjustment of the laser beam, the apparatus provides several adjustment features. One such feature is the spherical pilot feature. This feature allows for rotation of the beam in all three directions while maintaining position relative to the shaft. The spherical shape maintains it's location by being specifically sized to engage a bore located on the end of the chuck to be aligned. This bore is a required feature for this particular implementation. Another possible implementation is the use of a spherical knob located on the shaft and a bore located on the apparatus.

Three mounting screws are provided these screws provide a shoulder on which a bore can slide and are sometimes referred to as shoulder screws. These screws attach the apparatus to the end of the shaft. Clearance between the hole and the screw allows for relative movement. A spring captured between the underside of the screw head and the body of the device allows the body of the apparatus to rotate about the center of the spherical pilot. Additionally, a retaining ring is included in each bore to retain the shoulder screw while the apparatus is not in use.

A third feature of the invention is a plurality of threaded holes located on a second bolt circle. Set screws are installed into these threaded holes and engage the end surface of the chuck. These set screws help support the apparatus during adjustment and mounting on the rotating shaft. The combination of the set screws pushing against the end of the chuck and the spring pushing in the opposite direction against the body serve to clamp the body into position while also allowing for adjustment about the center of the spherical pilot.

A fourth feature of the invention is a plurality of concentric circles marking the surface from which the laser beam exits the apparatus. These circles work in conjunction with a second apparatus, to assist in the alignment of two rotating chucks. Once two apparatuses are appropriately mounted the laser beam from one apparatus can be pointed at the other apparatus by moving or adjusting the axes of rotation. The concentric circles provide a visible correlation between the concentricity of the two shafts.

As can be seen from reviewing the Background of Related Art and this summary of the invention several alignment issues are simplified.

DESCRIPTIONS OF THE DRAWINGS

Figure 2:
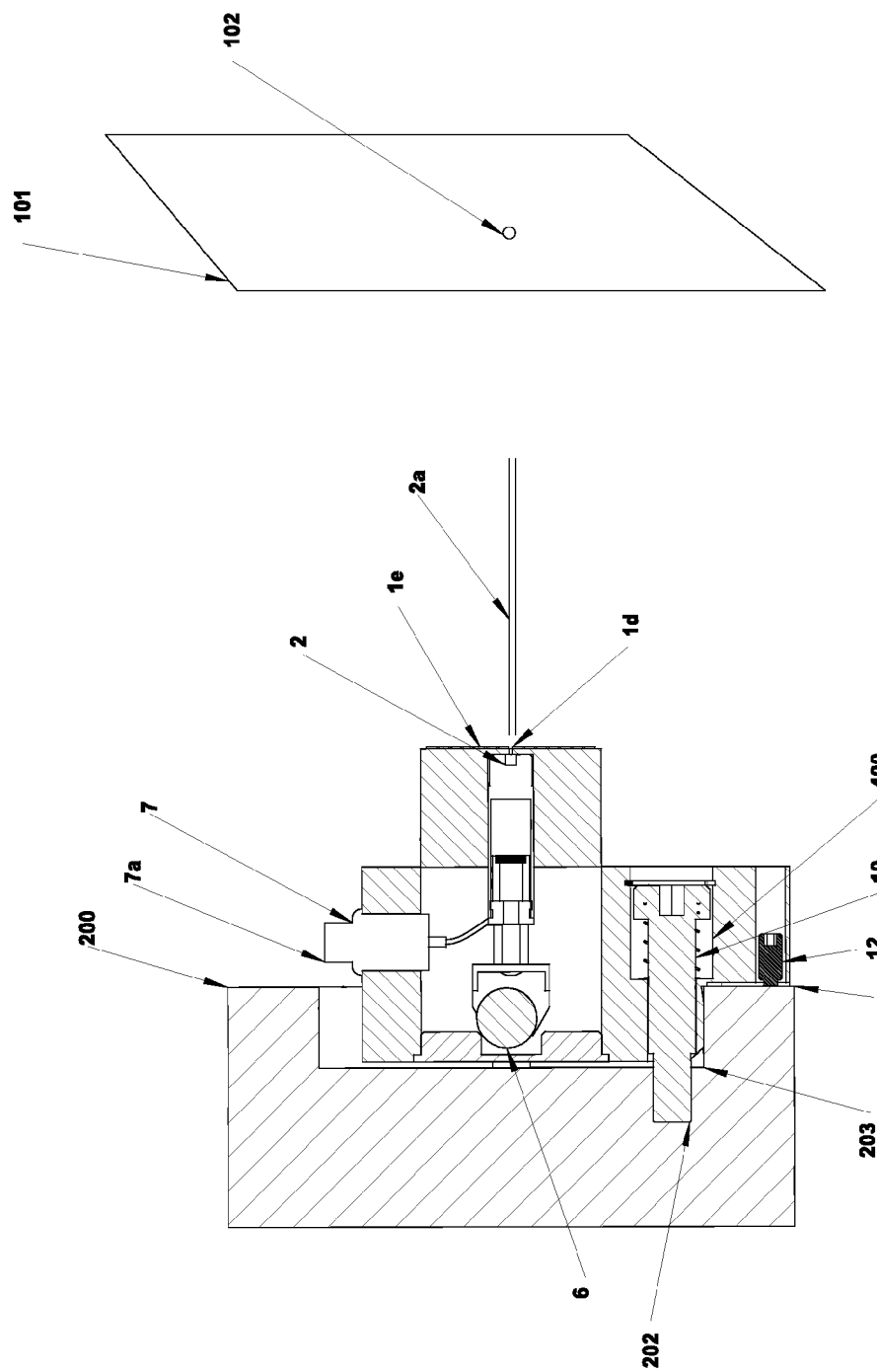
Figure 3:
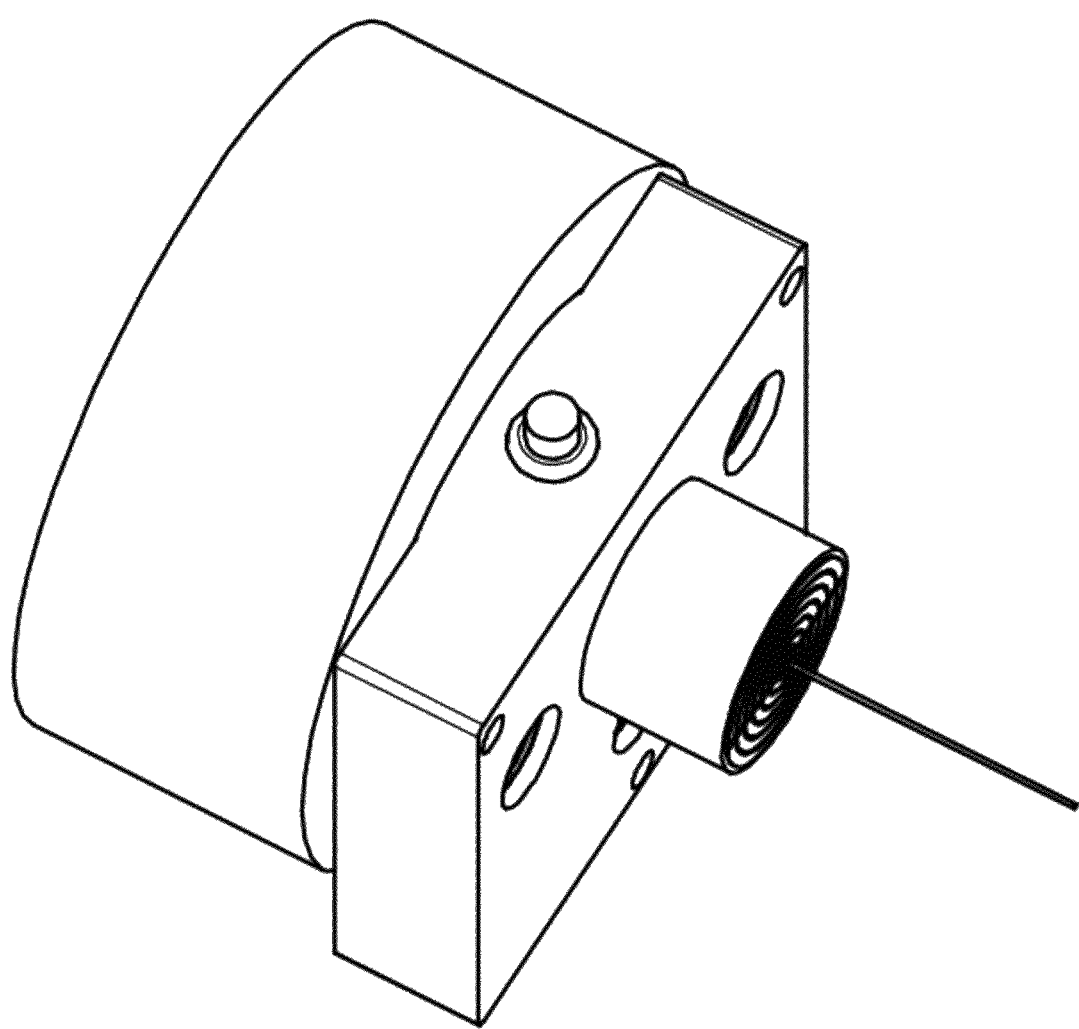
Figure 4:
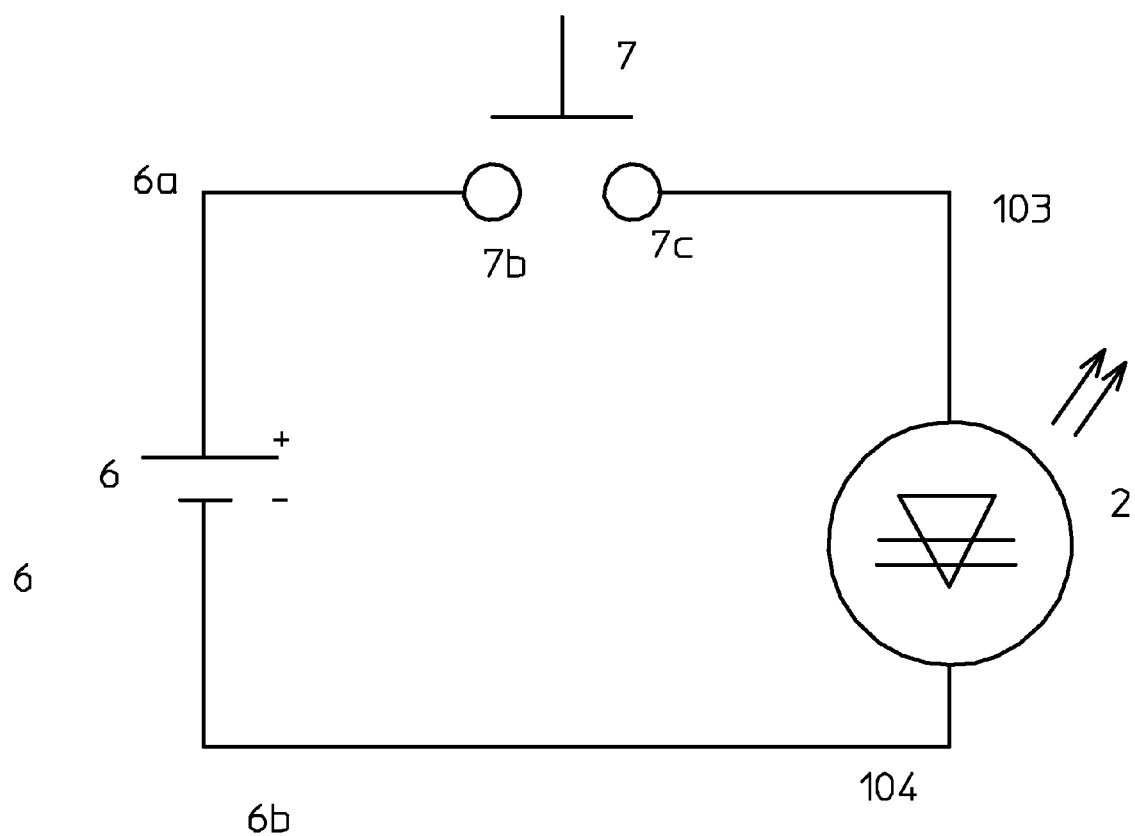
Figure 5:
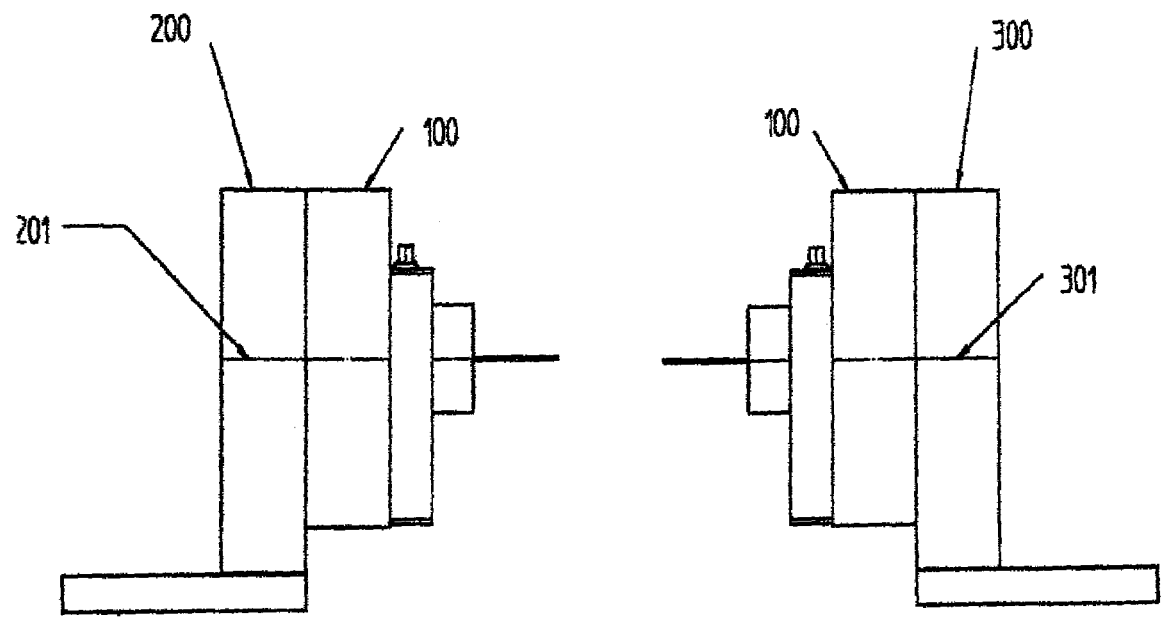
Figure 6:
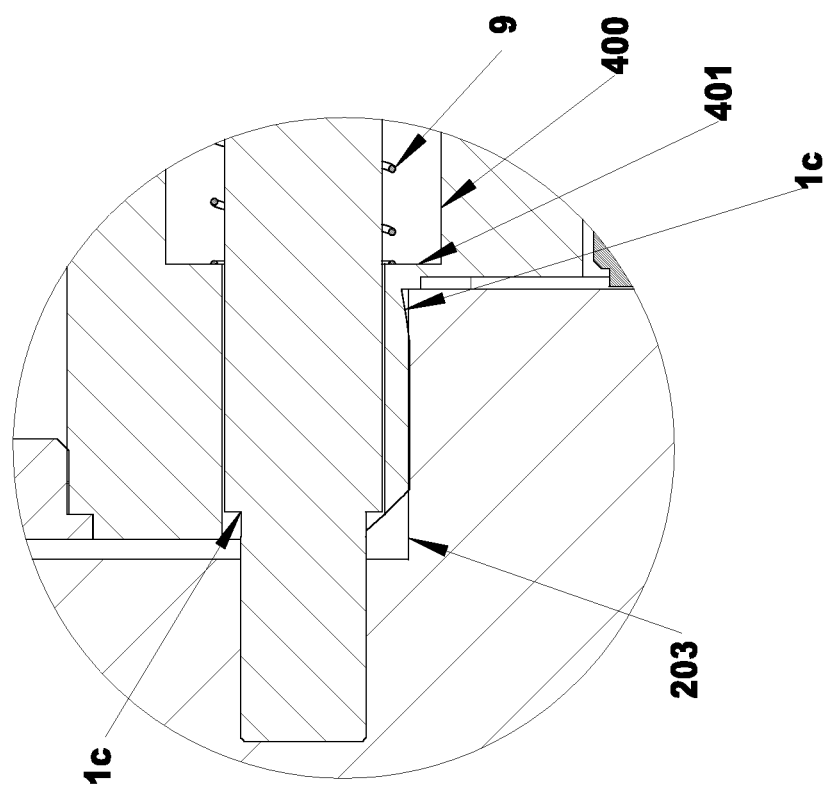
Figure 7:
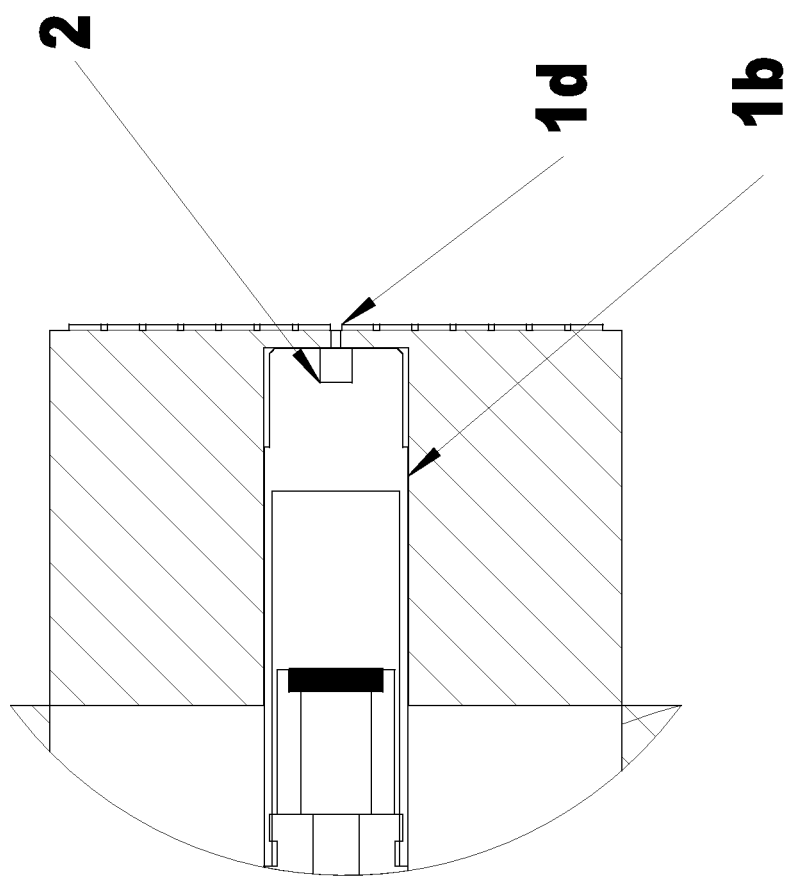

FIG. 1 - - - Front View
FIG. 2 - - - Section View A-A as established in FIG. 1
FIG. 3 - - - Isometric of the device
FIG. 4 - - - Electrical Schematic of the showing the electrical connections of the switch, laser and power supply
FIG. 5 - - - Side Elevation View of a Typical Installation
FIG. 6 - - - Enlarged View From FIG. 2 showing the Spherical Pilot
FIG. 7 - - - Enlarged View From FIG. 2 showing the Stepped Bore for the Laser

DETAIL DESCRIPTION OF INVENTION

The invention is a device for use when aligning two rotating chucks for use in the web handling industry. Web handling is a method of handling continuous strips or sheets of material typically for processing the web material. In this industry the rollers are used to drive the web, tension the web and direct the web. In most cases the rollers are supported on each end by rotatable shafts with roller mounting features commonly called chucks within the web handling industry.

Alignment of the chucks is a consistent problem within the industry causing excessive wear on equipment, inconsistent web tension, web movement along the handling rollers. Prior to the invention the industry has relied on various tools most of which used mock rollers attached to the chucks and trial and error alignment. With the use of the invention the time alignment can be checked continuously during the movement of one chuck to the other. Additionally, as will be explained below the two chucks are not physically attached to each other this is very helpful because movement of one chuck does not apply a force on the other. Since it is understood that excessive loads occur if the chucks are misaligned and subsequently attached to each other with stiff rollers, the ability of the invention to align the two chucks without inadvertently loading each other is a great improvement.

One embodiment of the apparatus will now be described. Thus providing a person skilled in the art to build and use the invention.

Referring to FIG. 2 the chuck alignment tool 100 includes a body 1 with a bore 1b that houses a laser 2, the bore 1b is located coincident with a spherical pilot surface 1c. The bore 1b is stepped to a small diameter orifice 1d which allows a small beam of laser light to emit from the body 1. This orifice 1d controls the diameter of the laser beam 2a thus decreasing the size of a dot 102 that the laser beam can project onto a surface 101. Since the dot size is reduced the accuracy of the alignment procedure is increased.

Returning to the laser 2, power is required to cause a beam 2a to be emitted. As shown in FIG. 4 wires 103 and 104 supply electrical power to the laser 2 by connecting the leads 6a and 6b of the battery holder 5 which holds the battery 6 to the laser wires 103 and 104. Wire 6a is connected to the battery holder 5 such that it is electrically connected to one side of the battery 6 and terminal one 7b of the switch 7. Terminal two 7c of the switch 7 is connected electrically to laser lead 103. Wire 6b however is connected to the battery holder 5 such that it is electrically connected to the other battery terminal and to laser wire 104. Electricity is conducted through the laser by closing the switch 7. The switch 7 includes a button 7a which completes a circuit from the battery lead 6a and allows electricity to flow through the laser 2 causing the laser beam 2a to emit from the orifice 1d.

The body 1 includes markings on the emitting surface 1e, circular markings 1f are concentric with the orifice 1d, linear markings 1g are perpendicular to each other and cross at the orifice 1d. These markings are used in conjunction with another chuck alignment tool 100 that is mounted on the chuck that is to be aligned.

Regarding use of the instant embodiment 100, some features of the chucks to be aligned need to be explained. Referring to FIG. 5 two chucks 200 and 300 are to be aligned, each chuck is supported in such a manner as to allow adjustment in location and orientation of each axis of rotation 201 and 301 respectively. Such adjustment allowance is not germane to the invention. The chuck 200 is shown with an axis of rotation 201. A bore 203 is provided and allows a sliding fit with the spherical pilot 1c of FIG. 2. This bore 203 and the spherical pilot 1c are precisely manufactured to allow rotation of the invention relative the bore 203 without translation of the alignment tool 100. Additionally, the chuck includes three threaded holes 202 for reception of the shoulder screws 10. Referring to FIG. 6 and FIG. 2 the shoulder screws 10 are further supporting the body 1 inside holes 400 and springs 9 which presses against shoulder 401 and the underside of the head of the shoulder screws 10. These holes 400 are stepped holes and include the shoulder or step 401. The chuck also provides a surface 204 essentially perpendicular to the bore 203, this surface 204 provides engagement with the alignment tool 100 set screws 12.

Use of the instant embodiment is now explained. First each chuck 200 and 300 is coarsely aligned such that the two chucks are pointed toward each other as shown in FIG. 5. The spacing between the two chucks is not germane to the invention and is defined by the specific roll that is to be supported by the chucks.

Referring again to FIG. 5 each alignment tool 100 is mounted to each chuck 200 and 300. To perform this mounting procedure the spherical pilot 1c is positioned inside the chuck bore 203 and the shoulder screws 10 are screwed into the threaded holes 202 on the chuck. Next the set screws 12 are used to push against the chuck mounting surface 204. The set screws are adjusted until the laser beam 2a does not move during rotation of the chuck 200. This assures that the laser beam 2a and the axis of rotation of the chuck 200 are coincident.

Pressing the switch 7a on each alignment tool 100 causes the laser device 2 to emit the laser beam 2a. The switch 7a is a typical latching mechanical switch provided by several manufacturers, since the switch 7a latches the laser beam 2a will continue to be emitted until switch 7a is unlatched.

First the alignment tool 100 is adjusted in the chuck bore 203 to align the laser beam 2a with the chuck axis of rotation 201. The projection surface 101 is positioned approximately perpendicular to the laser beam 2a and between the two chucks 200 and 300. The chuck 100 is now rotated and the movement of the laser beam dot 102 is tracked. Using the set screws 12 to adjust the orientation of the laser beam 2a to the chuck axis 201 the laser dot 102 will stop translating on the projection surface 101 when the laser beam 2a and the chuck axis of rotation 201 are aligned.

Once the laser beam 2a and the chuck axis 201 are aligned the projection surface 101 is repositioned as explained above except this positioning is relative to a second alignment tool 100 mounted on the opposite chuck 300. The orientation of the laser beam 2a relative to the chuck axis of rotation 301 is aligned in the manner explained above.

The projection surface 101 is now removed. Now the chucks 200 and 300 are adjusted in orientation and location until each laser beam 2a is pointed directly at each other. The concentric circular markings 1f and linear markings 1g are used to help make final adjustments of the chucks 200 and 300.

The above described alignment tool allows the chucks 100 and 200 to be positioned such that their axes of rotation 201 and 301 are coincident, without the use of rigid or flexible couplings between each chuck. This eliminates the adverse effects of this coupling. Additionally, the alignment is performed without the need for specialized mechanical tools that can affect the alignment.

We claim:

1. A chuck alignment tool for mounting on a chuck comprising;
   i. a body having a front surface and a back surface, a spherical pilot and a bore concentric with said spherical pilot, a plurality of stepped holes located around said bore and a plurality of threaded holes;
   ii. a laser having a cylindrical surface and first and second end, said first end emitting laser light located inside said bore with said first end pointed toward said front surface;
   iii. said spherical pilot located on said back surface of said body for engaging a chuck;

iv. a plurality of shoulder screws located coaxially with said stepped holes for attaching to a chuck;
v. a plurality of springs located coaxially with said shoulder screws and axially located in said stepped holes and the underside of said shoulder screw head for biasing said body against a chuck;
vi. a plurality of set screws located in said threaded holes of said body for pushing against a chuck for adjusting the orientation of said body relative to a chuck.

2. The chuck alignment tool of claim 1 wherein said front surface includes circular markings concentric with said spherical pilot surface.

3. The chuck alignment tool of claim 1 wherein said front surface includes two markings perpendicular to each other and intersecting on said front surface of said body coincident with said spherical pilot surface.

4. The chuck alignment tool of claim 1 wherein said bore includes an orifice for emitting a small laser beam from said front surface of the body coincident with said spherical surface.

5. The chuck alignment tool of claim 1 further comprising power supply for providing electrical power to said laser.

6. The chuck alignment tool of claim 5 comprising a switch for controlling said electrical power to said laser.

* * * * *